(12) United States Patent
Anand et al.

(10) Patent No.: US 6,845,451 B1
(45) Date of Patent: Jan. 18, 2005

(54) SYSTEM, METHOD AND PROGRAM FOR IMPLEMENTING LOGON ASSIGNMENTS AND PREFERENCES FOR USERS IN A HETEROGENEOUS NETWORK

(75) Inventors: Vaijayanthimala Anand, Austin, TX (US); Janet Roberts Callaway, Austin, TX (US); Steven Michael French, Austin, TX (US); Steven Pratt, Round Rock, TX (US); Dennis Wayne Riddlemoser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,820

(22) Filed: May 4, 2000

(51) Int. Cl.[7] .......................... G06F 11/30; G06F 15/173
(52) U.S. Cl. ....................................... 713/201; 709/223
(58) Field of Search ................................ 713/201, 200, 713/202; 709/223, 222, 229, 220, 227; 707/10

(56) References Cited

U.S. PATENT DOCUMENTS 5,812,784 A * 9/1998 Watson et al. .............. 709/227
5,944,824 A * 8/1999 He ............................. 713/201
6,088,451 A * 7/2000 He et al. ..................... 713/201
6,178,511 B1 * 1/2001 Cohen et al. ............... 713/201
6,205,476 B1 * 3/2001 Hayes, Jr. ................... 709/220
6,446,071 B1 * 9/2002 Callaway et al. ............. 707/10
6,633,906 B1 * 10/2003 Callaway et al. ........... 709/223

* cited by examiner

*Primary Examiner*—Ayaz Sheikh
*Assistant Examiner*—A. Sherkat
(74) *Attorney, Agent, or Firm*—Marilyn Smith Dawkins; Dillon & Yudell LLP

(57) ABSTRACT

A system, method, and program product for implementing logon assignments for users in a heterogeneous network are disclosed. Sets of logon assignments for a user for various platforms are defined and stored in a configuration server. The appropriate set of user logon assignments is selected, by either the configuration server or a client system, based on the user identity of the user and a software platform of the client system on which the user logs onto the heterogeneous network. The appropriate set of logon assignments is sent from the configuration server to the client system. The appropriate set of logon assignments is then implemented at the client system so that the user is able to use preferences and allocated resources specified by the set of logon assignments.

21 Claims, 3 Drawing Sheets

SYSTEM, METHOD AND PROGRAM FOR IMPLEMENTING LOGON ASSIGNMENTS AND PREFERENCES FOR USERS IN A HETEROGENEOUS NETWORK

BACKGROUND OF THE INVENTION

1. Technical Field

The present invention relates in general to a network environment, and, in particular, to the provision and implementation of preferences, logon assignments, and resource allocation to users in a heterogeneous network environment. Still more particularly, the present invention relates to a system, method, and program for implementing logon assignments to allocate network resources to users in a heterogeneous network environment that has various networked resources and systems, such as server systems and client systems, running under different software platforms using different file systems.

2. Description of the Related Art

In a homogeneous network environment, a user logs onto a homogeneous network by entering logon information or user account information at a client system, and the client system routes and communicates with a configuration server that has stored the information and user account that has been set up for the network user. The user is able to roam among and log on at any client system in the homogeneous network. In the homogeneous network, all of the server systems and client systems operate under a single software platform (i.e., single operating system).

After a user logs onto the homogeneous network through the client system, the configuration server sends to the client system a user profile that contains the profile of the user for the network. The user profile is a record containing information of an authorized user for the network. The user profile may contain security and access information, mailbox location, terminal type being used, "logon assignments", and other such preferences for the user. "Logon assignments" are resources or preferences that have been assigned and are managed for a user when the user logs onto the network. Resources include any part of a data processing system or network that can be assigned to a program or process when it is executing. Resources may include disk drives, directories of disk drives, printers, serial devices, peripheral devices, any other shared devices, and shared software programs. Logon assignments may include both hardware and software preferences for a user. One type of logon assignment is a "home directory". A "home directory" is a directory that exists for the user when the user first logs into the network, and the home directory typically contains user files for the user.

A method and system for providing these assignments and preferences to a roaming user logging into a homogeneous network at any client system within the homogeneous network presently exist. U.S. patent application Ser. No. 09/118,209 filed Jul. 17, 1998 entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES" assigned to International Business Machines, Armonk, N.Y. (IBM Docket No. AT9-98-259) discloses such an exemplary method and system. The present trend, however, is to implement heterogeneous networks and to enable users to roam and access the network through any system regardless of the software platform under which the system is operating.

A heterogeneous network environment includes networked systems, such as client systems and server systems, that operate under different software platforms (i.e., Windows NT, OS/2, UNIX, LINUX, AIX, etc.). The problem is that a user profile is generally limited to being set up and implemented for a user under a single software platform (i.e., a single operating system). The logon assignments and preferences for the user can only be sent to a client system in the homogeneous network operating under that platform. In this instance, the client system is able to implement the logon assignments and preferences, and the client system is able to attach and mount to the allocated resources specified by the logon assignments and preferences. However, if the user logs onto the heterogeneous network at a client system operating under a different platform, then the client system is not able to implement and execute the logon assignments and preferences in the user profile. Various allocated resources specified by the logon assignments and preferences for the user are then unable to be mounted or attached by the client system.

Therefore, the present invention recognizes that the provision and implementation of logon assignments and preferences must be expanded to a user(s) in a heterogeneous network. The client system must be enabled to mount allocated resources that have been specified by logon assignments and preferences regardless of the software platform or operating system of the client system at which the user has logged into the heterogeneous network.

SUMMARY OF THE INVENTION

A system, method, and program product for implementing logon assignments for users in a heterogeneous network are disclosed. Sets of logon assignments for a user for various platforms are defined and stored in a configuration server. The appropriate set of user logon assignments is selected, by either the configuration server or a client system, based on the user identity of the user and a software platform of the client system on which the user logs onto the heterogeneous network. The appropriate set of logon assignments is sent from the configuration server to the client system. The appropriate set of logon assignments is then implemented at the client system so that the user is able to use preferences and allocated resources specified by the set of logon assignments.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
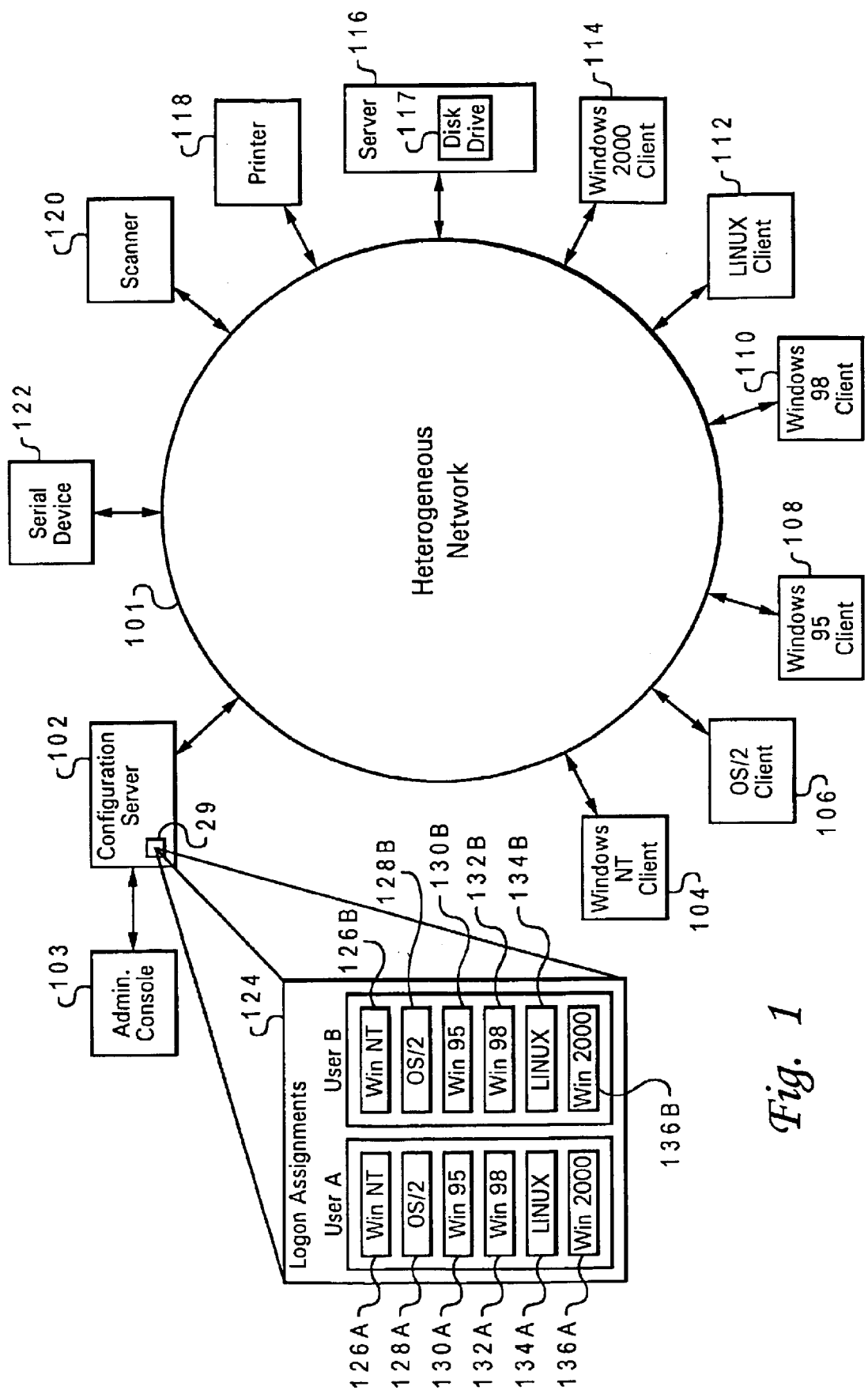
FIG. 1 is an exemplary hardware block diagram of a heterogeneous network according to the present invention.

With reference now to FIG. 1, an exemplary hardware block diagram of a heterogeneous network 101 that implements logon assignments and manages allocated resources for users in accordance with the present invention is shown. Heterogeneous network 101 includes a configuration server 102 coupled to an administrator console 103. An administrator uses administrator console 103 to communicate with configuration server 102. FIG. 1 shows administrator console 103 as a separate console coupled to configuration server 102. However, administrator console 103 may instead be made an integral part of configuration server 102.

The administrator uses administrator console 103 to set up user profiles in configuration server 102 for users within heterogeneous network 101. The user profiles are stored, for example, in a hard disk drive in configuration server 102. As stated earlier, the user profile is a record containing information, including logon assignments, of an authorized user for heterogeneous network 101. "Logon assignments" for the present invention are resources or preferences that have been assigned and are managed for a user when the user logs onto the heterogeneous network. The resources include any part of a data processing system or network that can be assigned to a program or process when it is executing. Resources may include disk drive 117, directories of disk drive 117, printer 118, scanner 120, serial device 122, peripheral devices, any other shared devices, and shared software programs. Logon assignments may include both hardware and software preferences for a user. One type of logon assignment is a "home directory". A "home directory" is a directory that exists for the user when the user first logs onto the heterogeneous network, and the home directory typically contains user files for the user.

The logon assignments are organized and stored for each user in his user profile as various sets of logon assignments for different platforms. For example, referring again to FIG. 1, logon assignments 124 for a user, such as User A and User B, are shown to respectively include a first set 126A and 126B for Windows NT, a second set 128A and 128B for OS/2, a third set 130A and 130B for Windows 95, a fourth set 132A and 132B for Windows 98, a fifth set 134A and 134B for LINUX, and a sixth set 136A and 136B for Windows 2000. If the user is User A and User A logs onto heterogeneous network 101 through client system 104 operating under Windows NT, then first set 126A of logon assignments is obtained from the user profile of the user and implemented by client system 104, and if User A logs onto heterogeneous network 101 through client system 106 operating under OS/2, then second set 128A of logon assignments is obtained from the user profile of User A and implemented by client system 106. Respective sets of logon assignments are similarly accessed for client system 106, 110, 112, and 114. The present invention is not in any way limited to being implemented for the software operating systems shown in FIG. 1, and the present invention may be used with any suitable operating system within heterogeneous network 101.

Each of the sets of logon assignments specifies allocated and managed resources that attach or mount to the client system at which the user has logged onto heterogeneous network 101. The allocated and managed resources may include a disk drive 117 in server 116, a directory or directories within disk drive 117, a printer 118, a scanner 120, a serial device 122, any other shared or networked device, and shared software programs. For example, a first set of logon assignments for Windows NT for the user may include mounting directory A in disk drive 117 of server 116, printer 118, and scanner 120 to client system 104 so that the user is able to access these devices when using client system 104. A second set of logon assignments for OS/2 for the user may include mounting directory A in disk drive 117 of server 116, printer 118, and scanner 120 to client system 106 so that the user is able to access these devices when using client system 106.

In this last example, the first set of logon assignments for Windows NT and the second set of logon assignments for OS/2 have generally the same assigned parameters for the same resources. However, instances may exist in which the sets of logon assignments may include different assigned parameters for various resources. For example, if one of the logon assignments or preferences for the user is to attach to disk drive 117 for accessing a shared application that only operates under OS/2, then second set 128A or 128B of logon assignments for the user operating client system 106 under OS/2 would contain a logon assignment to permit access to the OS/2 application. However, this logon assignment or preference would not be included in other sets of logon assignments since the OS/2 application would not be able to be run under any of the other platforms.

A general exemplary format for identifying a set of logon assignments for a platform stored in the user profile in accordance with the present invention is shown as follows:
Logon Assignment Profile is stored under=
\username\platform\language
in which
  "username" identifies the user;
  "platform" identifies the software platform or operating system (i.e., Windows NT, OS/2, Windows 95, Windows 98, LINUX, and Windows 2000) for which the logon assignments are to be implemented; and
  "language" identifies the human language preference for the user (i.e., English, French, Spanish, Chinese, etc.).
Each of the logon assignment profiles has associated configuration files for configuring the logon assignments for the user. The format for the configuration files varies for each different platform and may also vary for each different type of resource that is to be mounted to a client system.

For example, the format of the configuration file for a logon assignment under LINUX is as follows:
  <directory>=<server:export><fstype><parameters>
in which
  <directory> is the local directory to which the file system of the resource is to mount, <server:export> is the remote location which contains the file system of the resource to mount, <fstype> is the file system type of the files system of the resource to mount, and <parameters> specifies optional software parameters of the file system of the resource.
The home directory only contains one formatted entry while the logon assignment directory (i.e., mount directory) contains any number of formatted entries.

Furthermore, the configuration files for logon assignments in OS/2 are in binary format stored in a server-based binary file for a user. The configuration file for all file/directory type logon assignments are stored as key/value pairs in a group called "NetworkFileSystems". The configuration file for all print logon assignments are stored as key/value pairs in a group called "NetworkPrinters". The configuration file for all serial logon assignments are stored as key/value pairs in a group called "COMPORTS". The key/value information includes a Uniform Naming Convention (UNC) name of a remote resource and a device value (e.g., X,COM1, LPT2) that is used by client system 106 to connect to the remote resource at logon time.

Additionally, a configuration format of logon assignments recognizable by Windows NT does not exist (within the native operating system). However, such a configuration can be created to provide logon assignments to users that are logging onto heterogeneous network 101 through client system 104 operating under Windows NT.

Logon assignments for Windows NT are handled by configuration server 102 creating entries in a Windows style INI file for the logon assignments. When the user logs on at client system 104, the logon assignment file is read and processed by logon code of client system 104. The logon assignment file contains drive letters paired with network paths. Client system 104 issues a "net use" command to connect to the connections specified by the logon assignments. When logging onto a Windows NT domain at client system 104, the logon assignment file may be found in the following exemplary location:
\\logon_server name\TDMPRFLS\userid\operating_system\language\USRCFG.INI.
The command lines in the INI file may be in the following exemplary format:
[NetworkFileSystem]
f:=\\server_name\share_name
*=\\server_name\share_name
[NetworkPrinters]
lpt1: =\\server_name\printer_name.
The home directory information may also be contained with the same INI file. The home directory may be in the following exemplary format:
[HOMEDIR]
h: =\\server_name\home_dir_name.

An alternate configuration format for the logon assignments may be that the mount point, (i.e., the homedrive (h: in this example) is specified in the file USRCFG.INI, and the HOMEDIR (the Uniform Naming Convention (UNC) name, server_name\printer_name) is retrieved by a remote procedure call. This alternate format provides a common (operating system neutral) HOMEDIR (UNC name) and a platform specific mount point (e.g. driveletter). Note that * indicates a mount point (HOMEDRIVE) that is determined at logon time (e.g. instructs logon client to use next available drive or mount point rather than a predetermined, server configured, drive for this logon assignment).

Figure 2:
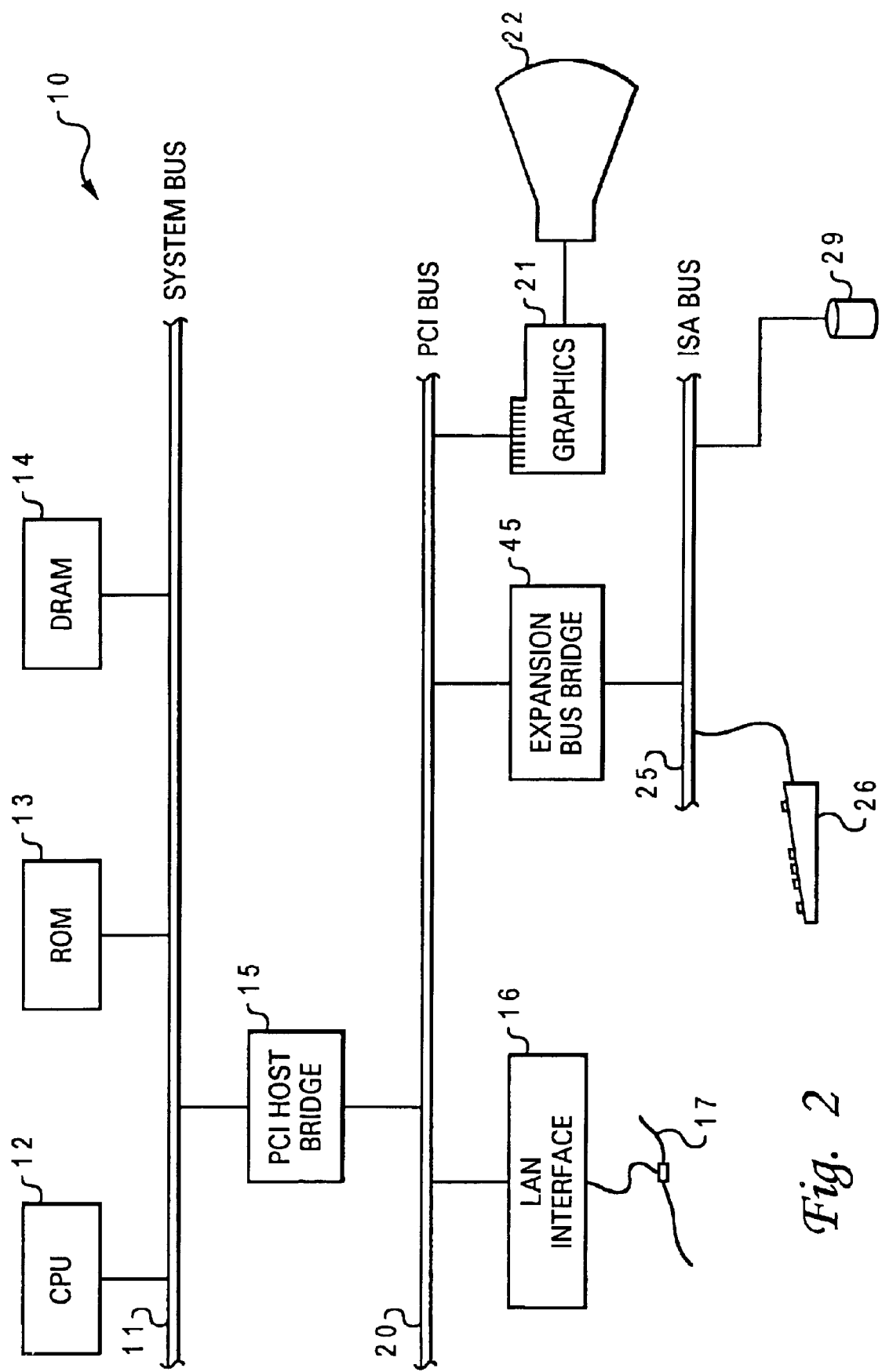
FIG. 2 is a block diagram of an exemplary embodiment of a data processing system, which may be the configuration server, one of the client systems, or a server system, that may be used by the present invention.

FIG. 2 shows an exemplary block diagram of a server system 10, which may be configuration server 102, administrator console 103, client system 104, 106, 108, 110, 112, or 114, or server 116, used for the present invention. As shown, a central processing unit (CPU) 12, read only memory (ROM) 13, and a Dynamic Random Access Memory (DRAM) 14 are connected to a system bus 11 of server system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path allowing PCI devices to directly access DRAM 14. A graphics adapter 21 may be attached to PCI local bus 20 for controlling visual output through display monitor 22. Also attached to PCI local bus 20 is a local-area-network (LAN) interface adapter 16. LAN interface adapter 16 is for connecting computer system 10 to a local-area network (LAN) 17. A PCI-to-ISA bus bridge, such as an expansion bus bridge 45, may be utilized for coupling an ISA bus 25 to PCI local bus 20. Although the illustrated exemplary embodiment describes a PCI local bus 20 and an ISA bus 25, the present invention is not limited to these particular bus architectures. Rather, the present invention can be utilized in any bus system having other different bus architectures. As shown, a keyboard 26 and a hard disk drive 29 may be attached to ISA bus 25 for performing certain basic I/O functions.

Figure 3:
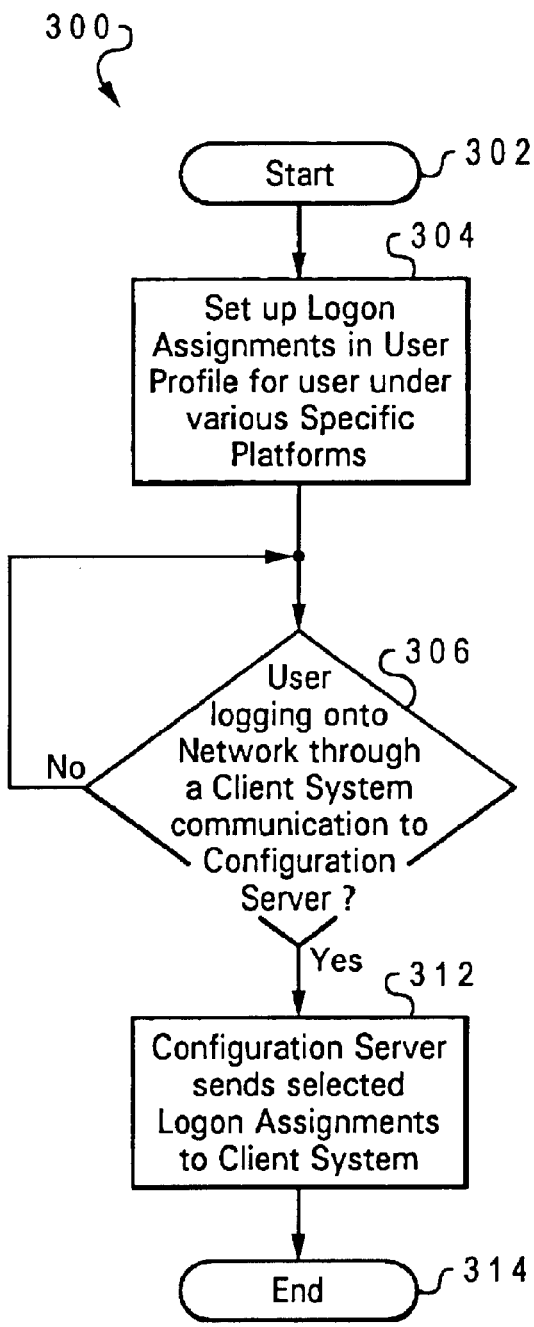
FIG. 3 is a flow chart of an exemplary method and program function executed by the configuration server for implementing the present invention.

Referring now to FIG. 3, a flow chart of an exemplary method 300 and program function performed by configuration server 102 for implementing the present invention is shown. Method 300 starts at block 302 and then proceeds to block 304, which depicts defining sets of logon assignments for a user for various different platforms in a user profile that is stored in hard disk drive 29 of configuration server 102. Method 300 proceeds to decision block 306, which depicts a determination of whether a user is logging onto heterogeneous network 101. If the user is not logging onto heterogeneous network 101, then method 300 iterates at decision block 306 until the user logs onto heterogeneous network 101. Configuration server 102 determines whether a communication with the client system has been established when the user logs onto heterogeneous network 101, and configuration server 102 waits until communication is established with the client system. When the user is logging onto heterogeneous network 101, method 300 moves to block 312.

Block 312 shows configuration server 102 sending the appropriate set of logon assignments selected, by either configuration server 102 or the client system, based on the identity of the user and the software platform of the client system to the client system. If configuration server 102 selects the appropriate set of logon assignments, then configuration server 102 establishes communication with the client system and waits to receive from the client system the software platform under which the client system is operating. After configuration server 102 receives the software platform from the client system, configuration server 102 selects and locates, in the user profile of configuration server 102, the appropriate set of logon assignments for the user for the software platform of the client system. Alternatively, if the client system selects the appropriate set of logon assignments, then the client system attaches to configuration server 102 and selectively retrieves from configuration server 102 the logon assignments for the user and the software platform. Method 300 then ends at block 314.

Figure 4:
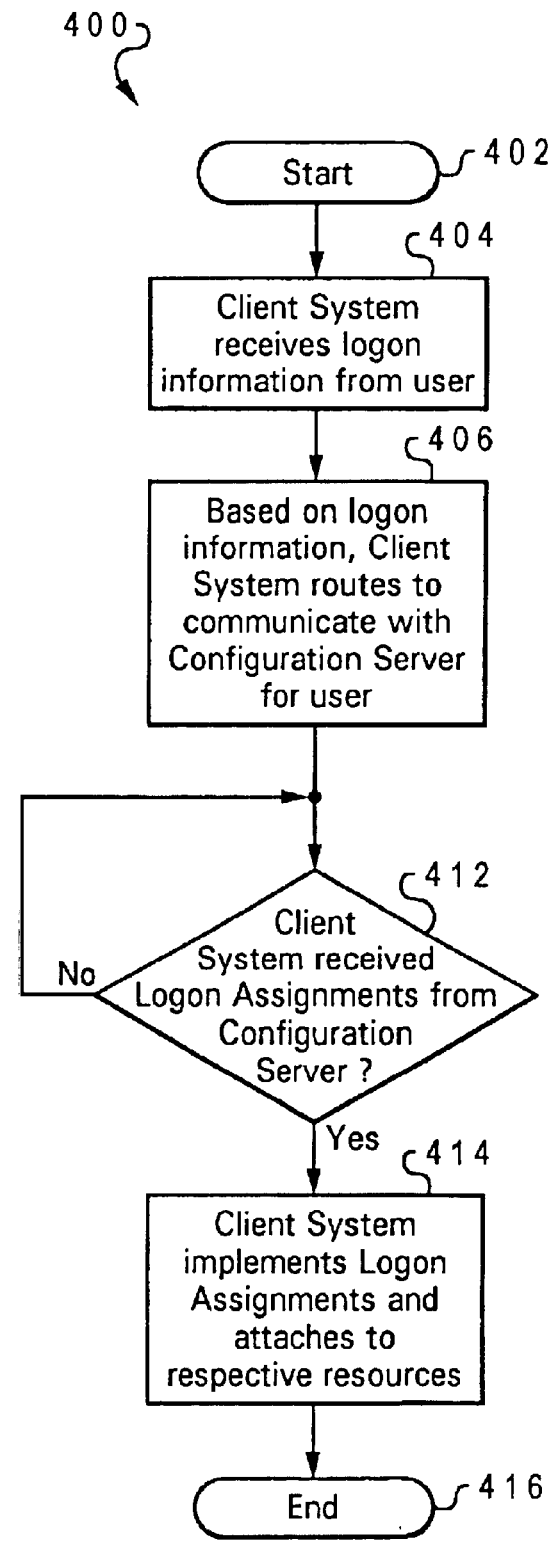
FIG. 4 is a flow chart of an exemplary method and program function executed by a client system for implementing the present invention.

With reference now to FIG. 4, a flow chart of an exemplary method 400 and program function executed by a client system for implementing the present invention is shown. Method 400 starts at block 402 and then moves to block 404, which shows the client system receiving logon information and user account information from the user. The client system communicates with configuration server 102 when the user logs onto heterogeneous network 101 through the client system. Method 400 proceeds from block 404 to block 406. Block 406 depicts the client system communicating with configuration server 102 that contains the information for the user.

Method 400 then moves to decision block 412, which illustrates a determination of whether the client system has received the appropriate set of logon assignments from configuration server 102. The appropriate set of logon assignments are selected, by either configuration server 102 or the client system, based on the identity of the user and the software platform of the client system. If configuration server 102 selects the appropriate set of logon assignments, then the client system sends the logon information of the user and the software platform of the client system to configuration server 102. Configuration server 102 responds by selecting and sending the appropriate set of logon assignments from configuration server 102 to the client system. Alternatively, if the client system selects the appropriate set of logon assignments, then the client system attaches to configuration server 102 and retrieves the appropriate set of logon assignments from configuration server 102 based on the selection made by the client system.

Method 400 iterates at decision block 412 until the client system receives the appropriate set of logon assignments from configuration server 102. Method 400 then moves to block 414. Block 414 depicts the client system implementing the appropriate set of logon assignments received from configuration server 102 so that preferences and allocated resources specified by the logon assignments are set up and utilized by the client system. Method 400 thereafter ends at block 416.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for implementing logon assignments for a plurality of users of a network, said method comprising:

defining a plurality of logon assignments for a user, wherein each of said plurality of logon assignments comprises an access driver and a logical identifier for a shared resource on a remote system, each of said plurality of logon assignment being used for a corresponding operating system platform among the plurality of diverse operating system platforms within a heterogeneous network, each of said plurality of logon assignments being assigned to a user identity;

storing, in a user profile that correlates with said user identity on a configuration server, said plurality of logon assignments for said user;

selecting, based on a designation of said user identity and an indication of a particular software platform of a client system, a logon assignment from said user profile, said logon assignment correlating to said user identity and said particular software platform of said client system; and sending, from said configuration server, said logon assignment, selected from said user profile to said client system via said heterogeneous network.

2. The method according to claim 1, wherein said sending step further comprises:

sending said logon assignment, such that said logon assignment specifies a managed resource that mounts to said client system, said client system having been logged onto by said user using said heterogeneous network.

3. The method to of claim 1, further comprises:

said configuration server receiving, through said heterogeneous network, an indication of said particular software platform of the said client system and said user identity of said user.

4. The method of claim 1, further comprising:

determining whether said configuration server has established a communication with said client system when said user logs onto the said heterogeneous network;

waiting for said communication to be established with said client system; and waiting, to receive said designation of said particular software platform and said user identity from said client system.

5. The method of claim 1, wherein said selecting step further comprises:

selecting a logon assignment on the basis of a submission from said client system.

6. The method of claim 1, wherein said storing step further comprises:

storing said logon assignment in a memory system of said configuration server.

7. The method claim 1, wherein said defining step further comprises defining said logon assignment to comprise a home directory.

8. A system for implementing logon assignments from a plurality of users of a network, said system comprising:

means for defining a plurality of logon assignments for a user, wherein each of said plurality of logon assignments comprises an access driver and a logical identifier for a shared resource on a remote system, each of said plurality of logon assignment being used for a corresponding operating system platform among the plurality of diverse operating system platforms within a heterogeneous network, each of said plurality of logon assignments being assigned to a user identity;

means for storing, in a user profile that correlates with said user identity on a configuration server, said plurality of logon assignments for said user;

means for selecting, based on a designation of said user identity and an indication of a particular software platform of a client system, a logon assignment from said user profile, said logon assignment correlating to said user identity and said particular software platform of said client system; and means for sending, from said configuration server, said logon assignment, selected from said user profile to said client system via said heterogeneous network.

9. The system of claim 8, wherein said sending means further comprises:

means for sending said logon assignment, such that said logon assignment further comprises means for specifying an allocated resource that mounts to said client system, said client system having been logged onto by said user using said heterogeneous network.

10. The system of claim 8, further comprising:

means for said configuration server receiving, through said heterogeneous network, an indication of said particular software platform of said client system and said user identity of said user.

11. The system of claim 8, further comprising:

means for determining whether said configuration server has established a communication with said client system when said user logs onto said heterogeneous network;

means for waiting for said communication to be established with said client system; and means for waiting to receive said designation of said particular software platform and said user identity from said client system.

12. The system of claim 8, wherein said selecting means further comprises:

means for selecting a logon assignment on the basis of a request from said client system.

13. The system of claim 8, wherein said storing means further comprises:

means for storing said logon assignment in a memory system of said configuration server.

14. The system of claim 8, wherein said means for defining further comprise means for defining a logon assignment to comprise a home directory.

15. A computer program product in a computer-readable medium for implementing logon assignments for a plurality of users of a network, said computer program product comprising:

a computer-readable medium;

instructions on the computer-readable medium for defining a plurality of logon assignments for a user, wherein each of said plurality of logon assignments comprises an access driver and a logical identifier for a shared resource on a remote system, each of said plurality of logon assignment being used for a corresponding operating system platform among the plurality of diverse operating system platforms within a heterogeneous network, each of said plurality of logon assignments being assigned to a user identity;

instructions on the computer-readable medium for storing, in a user profile that correlates with said user identity on a configuration server, said plurality of logon assignments for said user;

instructions on the computer-readable medium for selecting, based on a designation of said user identity and an indication of a particular software platform of a client system, a logon assignment from said user profile, said logon assignment correlating to said user identity and said particular software platform of said client system; and instructions on the computer-readable medium for sending, from said configuration server, said logon assignment, selected from said user profile to said client system via said heterogeneous network.

16. The computer program product of claim 15, wherein said sending instructions further comprise:

instructions on the computer-readable medium for sending said logon assignment, said logon assignment specifying a managed resource that mounts to said client system, said client system said user having been logged onto by said user using said heterogeneous network.

17. The computer program product of claim 15, further comprising:

instructions on the computer-readable medium for said configuration server receiving, through said heterogeneous network, an indication of said particular software platform of said client system and said user identity of said user.

18. The computer program product of claim 15, further comprising:

instructions on the computer-readable medium for determining whether said configuration server has established a communication with said client system when said user logs onto said heterogeneous network;

instructions on the computer-readable medium for waiting for said communication to be established with said client system; and instructions on the computer-readable medium for waiting to receive said designation of said particular software platform and said user identity from said client system.

19. The computer program product of claim 15, wherein said selecting instructions further comprise:

instructions on the computer-readable medium for selecting a logon assignment on the basis of a request from said client system.

20. The computer program product of claim 15, wherein said storing instructions further comprise:

instructions on the computer-readable medium for storing said logon assignment in a memory system of said configuration server.

21. The computer program product of claim 15, wherein said defining instructions further comprise instructions for defining logon assignments to comprise a home directory.

* * * * *

UNITED STATES PATENT AND TRADEMARK OFFICE
CERTIFICATE OF CORRECTION

PATENT NO. : 6,845,451 B1
DATED : January 18, 2005
INVENTOR(S) : Anand et al.

It is certified that error appears in the above-identified patent and that said Letters Patent is hereby corrected as shown below:

Column 7,
Line 51, delete "assignment" and insert -- assignments --.

Column 8,
Line 16, delete "the" and insert -- said --.
Line 30, between "method" and "claim" insert -- of --.

Column 10,
Line 12, delete "said user".

Signed and Sealed this

Twenty-first Day of March, 2006

JON W. DUDAS
*Director of the United States Patent and Trademark Office*